(12) United States Patent
Schievelbusch et al.

(10) Patent No.: US 6,930,489 B2
(45) Date of Patent: Aug. 16, 2005

(54) DEVICE FOR THE RECOGNITION OF RESIDUAL SYNCHRONIZATION ERRORS OF MULTIPLE SLATS OF FLAPS PLACED NEXT TO EACH OTHER IN AIRCRAFT

(75) Inventors: Bernd Schievelbusch, Lindenberg (DE); Christoph Winkelmann, Sendenhorst (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 0 days.

(21) Appl. No.: 10/445,417

(22) Filed: May 27, 2003

(65) Prior Publication Data

US 2004/0036477 A1 Feb. 26, 2004

(30) Foreign Application Priority Data

May 27, 2002 (DE) .......................................... 102 23 495

(51) Int. Cl.[7] .................... G01R 31/00; G01R 31/08; B64C 9/28
(52) U.S. Cl. ..................... 324/503; 244/217; 324/525
(58) Field of Search ................... 324/503, 508, 324/525; 244/213, 214, 215, 216, 217; 83/950, 358, 359; 30/116

(56) References Cited

U.S. PATENT DOCUMENTS

| 5,085,659 | A | * | 2/1992 | Rydell .......................... 606/47 |
| 5,628,477 | A | * | 5/1997 | Caferro et al. ............... 244/214 |
| 5,719,566 | A | * | 2/1998 | Readman et al. ............ 340/945 |
| 5,969,260 | A | * | 10/1999 | Belk et al. ..................... 73/773 |
| 6,004,011 | A | * | 12/1999 | Sieczkowski ................ 362/365 |
| 6,299,108 | B1 | * | 10/2001 | Lindstrom et al. ........... 244/213 |
| 6,520,396 | B2 | * | 2/2003 | Nakae ........................... 225/103 |

* cited by examiner

*Primary Examiner*—N. Le
*Assistant Examiner*—Jeff Natalini
(74) *Attorney, Agent, or Firm*—Dilworth & Barrese LLP.

(57) ABSTRACT

A device for the recognition of residual synchronization errors of multiple slats or flaps placed next to each other in an aircraft. The device includes a current carrying wire that runs through the slats or flaps. This wire is fastened at one end in the area of the gap between the slats or flaps and, on the other side, run through a cutting device. A detector can be used to detect and indicate the change in resistance when the wire is cut.

20 Claims, 1 Drawing Sheet

DEVICE FOR THE RECOGNITION OF RESIDUAL SYNCHRONIZATION ERRORS OF MULTIPLE SLATS OF FLAPS PLACED NEXT TO EACH OTHER IN AIRCRAFT

BACKGROUND OF THE INVENTION

The invention concerns a device for the recognition of residual synchronization errors of multiple slats or flaps placed next to each other in aircraft.

On aircraft wings, as a rule, multiple slats and/or flaps are placed next to each other. These are moved simultaneously during corresponding flight maneuvers. If breakage occurs in the suspension or drive of these slats or flaps, it is possible that one or even several of the slats or flaps placed next to each other no longer deploy to the extent desired. On the one hand, this results in undesirable forces on the aircraft due to asymmetry, and, on the other hand, in high mechanical stress of the flap bodies and the remaining intact drive train, as well as the structure of the wing itself.

In order to recognize the residual synchronization error of slats and flaps in the aircraft, it is already known, according to a first solution, for each flap segment to be equipped with linear travel sensors on the inside and outside edges. The signals of these sensors are used electronically to monitor synchronization. Such systems are comparatively complex in structure, since the current actual position of the slat or flap must be used.

This disadvantage is also present in a second known system in which angle sensors are used, instead of the linear travel sensors,.

Finally, as a third system for measuring the residual synchronization error of slats and flaps, the so-called lanyard system is known, in which a cable is stretched over the width of the slat or flap to be monitored The cable is fastened to the outside end of the outside flap segment and the flap segment is connected to a switch inside the wing. When synchronization errors occur, the changed length of the installation space is tightened and the switch is therefore operated. The signal from the switch is used to recognize the synchronization error. This system is relatively complex, due to the switch to be provided. Because the cable is so long, this system has an insensitive response behavior.

Finally, as a fourth system, a so-called overload recognition is known. After an error occurs in the flap operation, the remaining intact set assumes the entire air load of the flap segment. Additionally, the twisting of the flap segment causes high friction forces in the guides. The sum of these forces leads to actuation of the overload safety device and, as a result, to the stopping of the drive system. It is disadvantageous in this system that the structural components and the drive system are subjected to comparatively high mechanical stresses, since the drive system is stopped only after an overload is reached. This overload recognition is currently used, for example, in the slat system of the Airbus family.

SUMMARY OF THE INVENTION

The problem to be solved by this invention is to develop a device of this type for the recognition of residual errors in synchronization of multiple slats or flaps arranged next to each other, in such a manner that it can be produced relatively cheaply and reliably.

According to the invention, this problem is solved by providing the detection device with a current-carrying wire that passes through the slats or flaps arranged next to each other, where it is fastened on one end in the area of the gap between the slats or flaps and on the other side brought through a cutter device and, by means of a detector, the change in resistance of the wire at the cutter can be detected.

Compared to the above-described system in which the inner and outer edges of the flap segments are equipped with linear travel sensors or with angular sensors, it has the advantage of a substantially lower level of complexity. The device in accordance with the invention contains no moving parts, so that no wear occurs. Independently of this, the suggested system is clearly less expensive and also more reliable than a system equipped with corresponding travel sensors or angle sensors.

The group response behavior of the recognition device in accordance with the invention is especially advantageous as it is based on the short length of the wire. Here, there is a clear advantage compared to the known system, in which a cable is placed over the entire length of the slats or flaps arranged next to each other.

Finally, the recognition device in accordance with the invention has the advantage, as compared to the latest state of technology as discussed in the beginning, that due to the high sensitivity, the occurrence of a synchronization error is recognized relatively earlier, so that, due to the earlier reaction of the safety system, the mechanical stress on the structural components and the drive system can be substantially reduced.

Especially advantageous embodiments of the invention are also shown herein.

According to this, the cutter device can consist of an annular edge.

It is advantageous to select the distance between the wire and the annular edge in such a manner that the relative motion between the slats or flaps arranged next to each other, as a result of wing flexing and installation tolerances, does not lead to the cutting of the wire. This assures that a corresponding cutting of the wires and therefore a halting of the drive system of each of the flaps and/or slats takes place only in case of damage.

The wire can be fastened at one end simply by means of at least one clamping screw.

BRIEF DESCRIPTION OF THE DRAWINGS

Further details and advantages of the invention will be explained in greater detail using a sample embodiment represented in the drawing.

DESCRIPTION OF THE PREFERRED EMBODIMENTS

Figure 1:
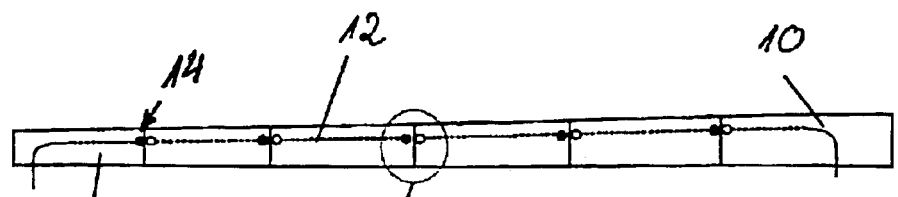
FIG. 1: A schematic arrangement of flaps arranged next to each other (without showing the entire wing)
Figure 2:
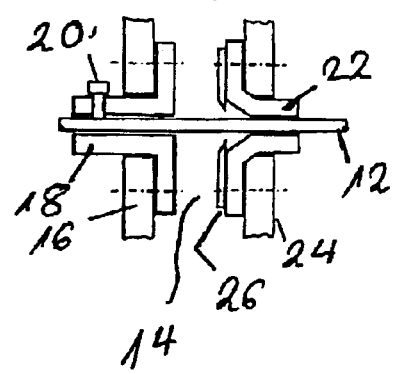
FIG. 2: A schematic representation of a magnified detail of the flaps according to FIG. 1 to clarify the invention.

In FIG. 1, six flaps 10 are arranged next to each other. Through the flaps 10 a current-carrying and protectively insulated wire 12 runs, which also bridges the interval between the flaps 14, which is drawn clearly in FIG. 2.

Not represented in detail is the electrical circuit, which is coupled to the wire 12. It contains a detector to recognize the change in resistance upon interruption of the current due to cutting the wire 12.

In order to detect the residual synchronization error of the flaps 10 arranged next to each other, the wire 12 that runs along the entire length of the flaps 10, which is installed in the space between the flaps 10, is attached on one end in a sidewall 16 of the first flap 10. For this purpose, the wire 12 is run through a kind of bushing 18 and fastened with a clamping screw 20. At the opposite side, the wire is run through a bushing 22 placed in the sidewall 24. This bushing 22 has an annular cutter 26 by means of which the wire 12 can be cut. The wire is cut when the neighboring flaps 10 do not move with the desired synchronicity.

Cutting the wire changes the resistance in the electrical circuit, which can be detected by the corresponding detector and used as an error display.

What is claimed is:

1. Device for the recognition of residual synchronization errors of multiple slats or flaps placed next to each other in aircraft, characterized in that, a current-carrying wire is fed through the slats or flaps arranged next to each other, where such wire is fastened at one end in the area of the gap between the slats or the flaps and on the other side fed through a cutting device and that, by means of a detector, the change in resistance can be detected when the wire is cut.

2. Device according to claim 1, characterized in that, the cutting device consists of an annular cutter.

3. Device according to claim 2, characterized in that, the distance between wire and the cutter is selected in such a manner that the relative movement caused by wing flexing and installation tolerances between the slats or flaps arranged next to each other does not cause the wire to be cut.

4. Device according to claim 3, characterized in that, the fastening of the wire at one end is done with at least one clamping screw.

5. Device according to claim 2, characterized in that, the fastening of the wire at one end is done with at least one clamping screw.

6. Device according to claim 1, characterized in that, the distance between wire and the cutter is selected in such a manner that the relative movement caused by wing flexing and installation tolerances between the slats or flaps arranged next to each other does not cause the wire to be cut.

7. Device according to claim 6, characterized in that, the fastening of the wire at one end is done with at least one clamping screw.

8. Device according to claim 6, wherein said wire extends across the gap or interval between adjacent flaps.

9. Device according to claim 8, wherein said cutting device is mounted upon each said flap except an initial flap.

10. Device according to claim 6, wherein said cutting device is mounted upon each said flap except an initial flap.

11. Device according to claim 1, characterized in that, the fastening of the wire at one end is done with at least one clamping screw.

12. Device according to claim 1, wherein said cutting device is situated on a sidewall of a flap.

13. Device according to claim 12, wherein said flap sidewall comprises a bushing through which said wire runs and upon which said cutting device, which is constituted by an annular cutter, is mounted.

14. Device according to claim 13, additionally comprising a bushing mounted upon a sidewall of an adjacent flap and through which said wire runs, such that said wire is cut when said adjacent flaps fail to move with synchronicity.

15. Device according to claim 14, wherein said wire is secured to said adjacent flap by at least one clamping screw extending through said respective bushing.

16. Device according to claim 13, wherein said wire extends across the gap or interval between adjacent flaps.

17. Device according to claim 16, wherein said cutting device is mounted upon each said flap except an initial flap.

18. Device according to claim 1, wherein said wire extends across the gap or interval between adjacent flaps.

19. Device according to claim 18, wherein said cutting device is mounted upon each said flap except an initial flap.

20. Device according to claim 1, wherein said cutting device is mounted upon each said flap except an initial flap.

\* \* \* \* \*